United States Patent [19]

Watanabe et al.

[11] Patent Number: 4,657,954
[45] Date of Patent: Apr. 14, 1987

[54] POLY (HYDROXY ETHER)

[75] Inventors: Katsuyoshi Watanabe, Nara; Yoshiya Fukuyama, Minoo, both of Japan

[73] Assignee: Sumitomo Chemical Company, Limited, Osaka, Japan

[21] Appl. No.: 857,396

[22] Filed: Apr. 21, 1986

Related U.S. Application Data

[63] Continuation of Ser. No. 639,513, Aug. 7, 1984, abandoned, which is a continuation of Ser. No. 328,192, Dec. 7, 1981, abandoned.

[30] Foreign Application Priority Data

Dec. 18, 1980 [JP]  Japan .................................. 55-179934
Sep. 10, 1981 [JP]  Japan .................................. 56-143564

[51] Int. Cl.$^4$ ............................................. C08L 63/02
[52] U.S. Cl. ..................................... 523/459; 524/439; 528/104
[58] Field of Search ......................... 523/459; 524/439; 528/104

[56] References Cited

U.S. PATENT DOCUMENTS

| | | | |
|---|---|---|---|
| 3,177,090 | 4/1965 | Bayes et al. .............................. | 117/72 |
| 3,399,160 | 8/1968 | Kemp .................... | 260/31.2 |
| 3,748,292 | 7/1973 | Stander ........................ | 260/18 PN |
| 3,796,582 | 3/1974 | Leahey et al. ...................... | 524/439 |
| 3,892,821 | 7/1975 | Koleske et al. ..................... | 260/860 |
| 3,979,211 | 9/1976 | Chaikin ................................ | 430/155 |
| 4,066,598 | 1/1978 | Beers et al. .......................... | 524/440 |
| 4,152,156 | 5/1979 | Voisin et al. ......................... | 430/150 |

FOREIGN PATENT DOCUMENTS 114697 of 1974 Japan .
652024 4/1951 United Kingdom .

OTHER PUBLICATIONS

Encyclopedia of Polymer Science and Technology, vol. 10, pp. 111-122.
Journal of Applied Polymer Science, vol. 17, pp. 2135-2144, (1963), "Polyhydroxyethers. I. Effect of Structure on Properites of High Molecular Weight Polymers from Dihydric Phenols and Epichlorohydrin" Reinking et al.
Journal of Applied Polymer Science, vol. 7, pp. 2145-2152, (1963), "Polyhydroxyethers. II. Effect of Structure on Properties of High Molecular Weight Copolymers from Dihydric Phenol Mixtures and Epichlorohydrin" Reinking et al.

*Primary Examiner*—Amelia B. Yarbrough
*Attorney, Agent, or Firm*—Stevens, Davis, Miller & Mosher

[57] ABSTRACT

Poly(hydroxy ether) having a repeat unit of the formula,

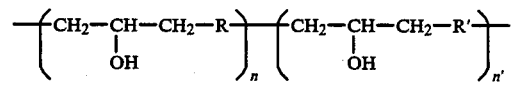

wherein R is a dihydric mononuclear phenol residue, R' is a dihydric polynuclear phenol residue, n is a positive number and n' is 0 or a positive number, provided that n and n' satisfy $35 \leq n+n' \leq 400$. The poly(hydroxy ether) is useful for the production of paints for metal, wood, glass and plastics as well as varnishes, primers, films, fibers, resin-modifying agents, and molding materials and it is particularly useful for zinc dust paints.

9 Claims, No Drawings

POLY (HYDROXY ETHER)

This application is a continuation of application Ser. No. 639,513, filed Aug. 7, 1984, now abandoned which in turn is a continuation of application Ser. No. 328,192, filed Dec. 7, 1981, now abandoned.

The present invention relates to a novel poly(hydroxy ether) of substantially linear form and its use.

Hitherto, poly(hydroxy ethers) of substantially linear form having a repeat unit of the following formula derived from bisphenol A,

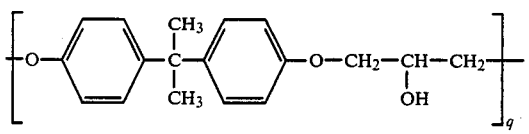

wherein q is a number of 80 to 160, are known [hereinafter referred to as bisphenol A type poly(hydroxy ethers)].

The bisphenol A type poly(hydroxy ethers) are good in various properties such as adhesion to substrates, chemical resistance, salt spray resistance, moisture resistance, impact resistance, abrasion resistance, flexibility, gloss and overbake resistance, so that they are suitable for various utilities such as coating, laminating, adhesives, films, fibers, molding materials and the like. Moreover, they have many hydroxy groups in the molecule, and therefore they are crosslinkable with polyisocyanates, melamine/formaldehyde resins, phenol/formaldehyde resins, urea/formaldehyde resins and the like.

More specifically, the bisphenol A type poly(hydroxy ethers) are used for clear metal coating, binders for magnetic tape, primers for metal, decorative coating on metal, zinc dust paints, clear coating on wood, coating or laminating on flexible substrates such as cellophane, aluminum foil, card-board, kraft paper, canvas cloth, phenol resin impregnated paper, glass fiber cloth and sheet or film of polyethylene terephthalate, polystyrene, polycarbonate and polymethyl methacrylate, coating or laminating on food-packaging goods, (hot melt) adhesives, varnishes for electric wire, and modifiers for resins such as epoxy resins, phenol resins and polyester resins. Also, films made from such poly(hydroxy ethers) are useful as rigid or flexible food-packaging containers, because they are tasteless and odorless as well as superior in oxygen barrier, heat sealability, staining resistance and low-temperature characteristics.

At present, however, the performances required in the above fields have become much higher, and poly(hydroxy ethers) having further improved properties have been sought.

For the reasons described above, the present inventors have extensively studied the various properties of the bisphenol A type poly(hydroxy ethers), and as a result found that replacement of all or part of the bisphenol A skeletons in the main chain of the bisphenol A type poly(hydroxy ethers) with a dihydric mononuclear phenol leads to great improvements in the properties, particularly, film coating properties such as adhesion to substrates, chemical resistance, salt spray resistance, flexibility and impact resistance, and properties of oxygen barrier and heat sealability.

The present invention provides a poly(hydroxy ether) of substantially linear form having a repeat unit of the formula (I),

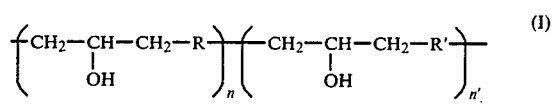

wherein R is a dihydric mononuclear phenol residue, R' is a dihydric polynuclear phenol residue, n is a positive number and n' is 0 or a positive number, provided that n and n' satisfy $35 \leq n+n' \leq 400$.

In the present invention, when the poly(hydroxy ether) of the formula (I) is a copolymer ($n' \neq 0$), all of random, block and alternating copolymers are included in the scope of the present invention.

The poly(hydroxy ether) of the formula (I) may be produced, for example, by reacting one or more dihydric mononuclear phenols with an epihalohydrin with or without addition of a dihydric polynuclear phenol, in the presence of a catalyst, or by reacting a dihydric mononuclear phenol or dihydric polynuclear phenol with an epihalohydrin to obtain a diepoxide, and then reacting the diepoxide with a dihydric mono- or polynuclear phenol or a mixture thereof in the presence of a catalyst.

The dihydric mononuclear phenols usable in the present invention include resorcinol, hydroquinone, catechol, substituted resorcinols such as alkylresorcinols (e.g. 5-methylresorcinol, 2,5-dimethylresorcinol, 5-ethylresorcinol, 4,5-dimethylresorcinol), alkenylresorcinols and halogenated resorcinols, substituted hydroquinones such as alkylhydroquinones, alkenylhydroquinones and halogenated hydroquinones, and substituted catechols such as alkylcatechols, alkenylcatechols and halogenated catechols. They may be used each alone or in a mixture of two or more. Of these, resorcinol is particularly preferred.

The dihydric polynuclear phenol includes, for example, bisphenol A, bis(4-hydroxyphenyl)alkanes such as bis(4-hydroxyphenyl)methane, 1,1-bis(4-hydroxyphenyl)ethane and 2,2-bis(4-hydroxyphenyl)butane, bis(4-hydroxyphenyl)cycloalkanes such as 1,1-bis(4-hydroxyphenyl)cyclohexane, and dihydric polynuclear phenols having a hydroxyl group at each nucleus such as dihydric dinuclear phenols (e.g. 4,4'-dihydroxybiphenyl). The dihydric polynuclear phenols may be used each alone or in a mixture of two or more. Of these phenols, bisphenol A is particularly preferred.

In the present invention, the amount of dihydric mononuclear phenols used is at least 1 wt.%, preferably not less than 5 wt.% based on the weight of the poly(hydroxy ether).

As the epihalohydrin usable in the present invention, epichlorohydrin is most preferred industrially. It is used in amounts substantially equimolar to the foregoing phenols, and generally, the amount of the epihalohydrin is 0.98 to 1.02 mole per mole of the foregoing phenols. The amount of diepoxide is substantially equimolar to the dihydric phenols, and the amount is generally 0.98 to 1.02 mole.

Reaction between the above phenols and epihalohydrin, or between diepoxide and dihydric phenols may be carried out in the presence of a catalyst such as an alkali metal hydroxide or halide, a tertiary amine or quarternary ammonium salt with or without an organic solvent such as a ketone (e.g. methyl ethyl ketone), dioxane, or dimethylformamide. In the reaction between the above phenols and epihalohydrin, the reaction temperature is from ambient temperature to 120° C., preferably from ambient temperature to 100° C., and the reaction time is usually from 10 to 30 hours. In the reaction between the diepoxide and the dihydric phenols, the reaction temperature is from ambient temperature to 200° C., preferably 60° to 150° C., and the reaction time is from 5 to 25 hours. When sodium hydroxide is used as the catalyst, the amount thereof is about 0.6 to 1.5 mole per mole of the above phenols in the reaction between the above phenols and the epihalorohydrin or 0.005 to 0.1 mole per mole of the dihydric phenols in the reaction between dihydric phenols and the diepoxide.

Although, the poly(hydroxy ether) of the present invention may have good properties even if its molecular weight is lower than, for example, that of the bisphenol A type poly(hydroxy ethers), in order to obtain a remarkable improvement on the various properties, the sum of n and n', the number of the repeat units, in the foregoing formula (I) must be not less than 35. When the sum is less than 35, a sufficient improving effect can not be expected. Whereas, the sum exceeding 400 is disadvantageous from economical and operational viewpoints. In the present invention, therefore, the sum needs to be 35 to 400 both inclusive. The sum can easily be controlled by changing reaction temperature, reaction time and etc.

The thus obtained poly(hydroxy ether) of the present invention may be applied as resin compositions to practical use according to the intended uses as described above by the usual methods well known to those skilled in the art. If desired, the present poly(hydroxy ether) may be modified in a manner known for the modification of the bisphenol A type poly(hydroxy ethers) and other type poly(hydroxy ethers). The modification may be carried out, for example, by crosslinking the present poly(hydroxy ethers) with the well-known polyisocyanate, melamine/formaldehyde resins, phenol/formaldehyde resins or urea/formaldehyde resins, or by using the carboxylic acid as described in Japanese Patent Publication No. 1449/1974, or, for the purpose of improving flexibility, by addition of a polyfunctional hydroxyl-modifying agent of lower molecular weight as described in Japanese Patent Publication No. 6990/1965.

Although the poly(hydroxy ether) of the present invention may be applied for markedly extensive uses like those of the bisphenol A type poly(hydroxy ethers), a detailed explanation is given below with respect to the application of the poly(hydroxy ethers) to so-called zinc dust paint.

Paints (including primers) comprising a zinc dust as an anticorrosive pigment and an organic or inorganic binder are known as zinc dust paints. The zinc dust pigments exhibit a usual covering effect due to the pigment, and also an anticorrosive effect due to the sacrificial anode effect of zinc to a substrate to be covered (usually surface-treated or non-treated iron) as well as a covering effect owing to corroded products of zinc produced by the anode effect.

As the binder for the zinc dust paint, many kinds of inorganic or organic binders have been used according to and depending on the intended uses and the characteristics of the binders.

The inorganic binders include for example sodium silicate (water glass), potassium silicate, magnesium phosphate cement, ethyl silicate, butyl titanate, quaternary ammonium silicate and colloidal silica. The organic binders include for example poly(hydroxy ethers) including the bisphenol A type poly(hydroxy ethers), chlorinated rubbers, cyclized rubbers, isomerized rubbers, epoxy/polyamide resins, epoxy ester resins, polyurethane resins, phenol resins, phenolmodified alkyd resins and melamine resins.

As apparent from the fact that zinc dust paints containing the poly(hydroxy ethers) such as the bisphenol A type poly(hydroxy ethers) as the binder have been applied for the production of a corrosion preventive steel plate, such poly(hydroxy ethers)-containing paints are superior to those containing other binders in various properties such as adhesion to substrates to be covered, corrosion resistance, flexibility of coating films formed on substrates, impact resistance, overcoatability on primer films and processability of coated substrates. However, such properties of the conventional poly(hydroxy ethers)-containing paints are not always satisfactory and therefore it is desirable to improve them much more.

Thus, another aspect of the present invention is to provide a zinc dust paint comprising zinc dust and the poly(hydroxy ether) of the formula (I).

A detailed explanation for the present zinc dust paint is given as follows.

Zinc dust usable in the present invention is not particularly limited in its purity, particle size and shape. The content of zinc dust in the paint is not less than 70 wt.%, preferably not less than 80 wt.% based on the weight of dry film formed by coating the paint. When the content is less than 70 wt.%, there is a tendency for the coating film to lower in corrosion resistance to, for example, salt water. When the content exceeds 97 wt.%, the paint gives no satisfactory coating film, because of shortage in the amount of binder. Consequently, the content of zinc dust in the paint is preferably 80 to 95 wt.%. The balance is substantially composed of the binder.

The zinc dust paint of the present invention may be produced by uniformly mixing the poly(hydroxy ether) of the formula (I) with a predetermined amount of zinc dust. Preferably, the poly(hydroxy ether) may be dissolved in a solvent prior to the mixing with zinc dust. The solvent includes for example ethyl cellosolve acetate, methyl cellosolve, ethyl cellosolve, butyl cellosolve, methyl ethyl ketone, methyl isobutyl ketone, acetone, xylene, butanol and mixtures thereof. The weight ratio of the poly(hydroxy ether) to the solvent is preferably 5/95 to 50/50, more preferably 10/90 to 35/65.

If necessary, the zinc dust paint of the present invention may further contain, for example, the bisphenol A type poly(hydroxy ethers), crosslinking agents such as polyisocyanate, melamine/formaldehyde resins, phenol/formaldehyde resins or urea/formaldehyde resins, pigments other than zinc dust and other additives for paints such as anti-skinning agents, thickening agents, anti-floating agents, dispersing agents, anti-settling agents, anti-foaming agents and antiseptics.

The pigments other than zinc dust include, for example, zinc oxide, zinc chromate, calcium plumbate, basic lead sulfate, white lead, red lead, basic lead chromate, basic lead silicochromate, lead cyanamide and lead suboxide. The dispersing agents include for example sodium petroleumsulfonate, metallic soaps, naphthenates, alkyl sulfates, fatty acid amides, aminofatty acids and their salts, sulfonated naphthalene alkyl ether, diethylaminoethylsterylamide hydroacetate, 3,9-diethyl-6- tridecanol sulfuric acid ester, quaternary ammonium salts, fatty acid partial esters of polyhydric alcohols, polyoxyethylene alkyl ethers and polyoxyethylene alkylaryl ethers.

As metal substrates to be covered with the zinc dust paint of the present invention, there are given all metals including iron, aluminum, zinc plated steel (galvanized steel sheet) and the like. These metal substrates may be single-layer or plural-layer products which may be either of wire-like, rod-like or plate-like products, or processed products therefrom. If necessary, these metal substrates may be subjected, prior to the coating, to degreasing, derusting or chemical pretreatment (chemical conversion coating).

The methods of degreasing, derusting and chemical pretreatment are not particularly limited, and for example, the chemical pretreatment may be carried out by the phosphate process or chromate process.

The zinc dust paint of the present invention may be applied to the metal substrates by any of spray coating, roll coating and brush coating methods.

Coating films formed from the zinc dust paint of the present invention are superior in processability, flexibility, adhesion, corrosion resistance, impact resistance, overcoatability and the like. Further, metal substrates covered with the zinc dust paint of the present invention, because of their excellent film characteristics, are superior in chemical resistance, flexibility, salt spray resistance and durability thereof. Moreover, the substrates are superior in secondary processability, because they are superior in impact strength and therefore resistant to processing conditions in drawing, pressing, compression, bending and the like.

The present invention will be illustrated in more detail with reference to the following examples, which are not however to be interpreted as limiting the invention thereto. Unless otherwise stated, all parts in the examples are by weight.

EXAMPLE 1

To a flask equipped with a condenser were added 135.8 parts of resorcinol diglycidyl ether (Sumi-epoxy ELR-130, produced by Sumitomo Chemical Co.), 11 parts of hydroquinone 44 parts of resorcinol, 190.8 parts of methyl ethyl ketone and 4 parts by volume of 5N aqueous sodium hydroxide, and the reaction was carried at the reflux temperature for 18 hours.

The resin liquor obtained was slowly added to water in a mixer to deposit a water-insoluble resin. This resin was dried under reduced pressure to obtain powdery poly(hydroxy ether). The molecular weight by gel permeation chromatography (described later in detail) of this resin was 20000, and the number of repeat units was 120. This is hereinafter called "sample A".

EXAMPLE 2

To the same equipment as used in Example 1 were added 131.1 parts of 2,2-bis(4-hydroxyphenyl)propane diglycidyl ether (Sumi-epoxy ELA-128, produced by Sumitomo Chemical Co.), 38.6 parts of resorcinol, 169.7 parts of methyl ethyl ketone and 5 parts by volume of 5N aqueous sodium hydroxide, and the reaction was carried at the reflux temperature for 24 hours. The resin liquor obtained was treated in the same manner as in Example 1 to obtain powdery poly(hydroxy ether) having a molecular weight of 35000 (the number of repeat units, about 135). This is hereinafter called "sample B".

EXAMPLE 3

To the same equipment as used in Example 1 were added 289 parts of 2,2-bis(4-hydroxyphenyl)propane diglycidyl ether (Sumi-epoxy ESA-011, produced by Sumitomo Chemical Co.), 33 parts of resorcinol, 322 parts of methyl ethyl ketone and 8 parts of volume of 5N aqueous sodium hydroxide, and the reaction was carried out at the reflux temperature for 22 hours. Poly(hydroxy ether) thus obtained had a molecular weight of 30000 (the number of repeat units, about 120). This is hereinafter called "sample C".

EXAMPLE 4

To the same equipment as used in Example 1 were added 131.1 parts of Sumi-epoxy ELA-128 (the same as above). 38.6 parts of hydroquinone, 684 parts of cyclohexanone and 21 parts by volume of 10N aqueous sodium hydroxide, and the reaction was carried at 120° C. for 6 hours. The resin liquor obtained was slowly added to a water/isopropyl alcohol mixture in a mixer to deposit a water-insoluble resin. This resin was dried under reduced pressure to obtain powdery poly(hydroxy ether). The molecular weight of this resin was 46000 (the number of repeat units, about 200). This is hereinafter called "sample G".

Comparative Example 1

To the same equipment as used in Example 1 were added 112.4 parts of Sumi-epoxy ELA-128 (the same as above), 68.4 parts of 2,2-bis(4-hydroxyphenyl)propane, 180.8 parts of methyl ethyl ketone and 4.5 parts by volume of 5N aqueous sodium hydroxide, and the reaction was carried at the reflux temperature for 20 hours. The resin liquor obtained was treated in the same manner as in Example 1 to obtain poly(hydroxy ether) having a molecular weight of 38000 (the number of repeat units, about 135). This is hereinafter called "sample D".

Comparative Example 2

Procedure was carried out in the same manner as in Example 2, except that the reaction time was 8 hours. Thus, powdery poly(hydroxy ether) having a molecular weight of 7000 was obtained (the number of repeat units, about 30). This is hereinafter called "sample E".

The samples obtained in the Examples and a reference sample F, Bakelite Phenoxy Resin PKHH [a poly(hydroxy ether) compound produced by Union Carbide Corp.], were measured for physical properties. The results are as follows:

1. Viscosity and degree of coloration

Each sample was dissolved in ethylene glycol monomethyl ether so as to make the resin concentration (solid content) 25 wt.%, and the solution was measured for viscosity and degree of coloration. The results are shown in the following table.

| Sample | A | B | C | D | E | F | G |
|---|---|---|---|---|---|---|---|
| Viscosity (Gardner, 25° C.) | v~w | y~z | y | z | s | z | z3 |
| Degree of coloration (Gardner) | #1~#2 | #1 | #1~#2 | #1 | #1 | #1 | #6 |

2. Molecular weight

Molecular weight obtained by gel permeation chromatography was as follows, as converted to the molecular weight of polystyrene.

| Sample | A | B | F | G |
|---|---|---|---|---|
| Number average molecular weight | 9,000 | 10,500 | 15,400 | 14,000 |
| Weight average molecular weight | 91,000 | 98,300 | 83,000 | 96,600 |
| Molecular weight at maximum peak | 20,000 | 35,000 | 44,000 | 46,000 |
| Number of peaks | 1 | 1 | 1 | 1 |

3. Content of dihydric mononuclear phenol

The content of dihydric mononuclear phenol was measured by nuclear magnetic resonance spectrography. The results are shown in the following table.

| | Sample | A | B | F |
|---|---|---|---|---|
| a | Integral strength of all hydrogens linked to the aromatic nucleus (relative value) δ 6.2–7.5 ppm | 1 | 1 | 1 |
| b | Integral strength of the methyl group of bisphenol A δ 1.3–1.8 ppm | 0 | 0.465 | 0.746 |
| | Content of dihydric mononuclear phenol calculated from a and b (wt. %) | 66 | 27 | 0 |
| | Content of dihydric mononuclear phenol calculated from the feed amount (wt. %) | 66 | 22.7 | 0 |

Note:
1. Chemical shift, δ, was expressed with tetramethylsilane as internal standard.
2. The solvent used in nuclear magnetic resonance spectrography was heavy hydrogen-substituted dimethylformamide and heavy hydrogen-substituted chloroform.
3. All the samples were tested after they were substituted with heavy hydrogen.

EXAMPLE 5

The samples A, B, C, D, E and G obtained in the production examples and a reference sample F were each dissolved in ethyl cellosolve acetate to obtain a 25 wt.% solution. The solution was mixed with zinc dust in a weight ratio as described below, and the mixture was violently stirred for 20 minutes by means of a homo-mixer to prepare a zinc dust paint. The paint thus obtained was coated on zinc phosphate-treated cold-rolled steel plate [steel plate (thickness, 0.4 mm and 0.8 mm; specified by JIS G-3141) pretreated with a treating agent, Bonderite 3100 (produced by Nihon Parkerizing Co. Ltd.)] by means of a bar coater, and then force-dried at 270° C. for 2 minutes. Using this steel plate as test piece, the physical properties of the coating film were evaluated.

Recipe of paint:

| | |
|---|---|
| Zinc dust (LS-4, produced by Mitsui Kinzoku Co.) | 87 |
| 25 wt. % Solution of the sample (corresponding to 13 parts of the sample) | 52 |

The results are shown in Table 1.

TABLE 1

| Sample (resin) | | A | B | C | G | D | E | F |
|---|---|---|---|---|---|---|---|---|
| Molecular weight of the resin | | 20000 | 35000 | 30000 | 46000 | 38000 | 7000 | 44000 |
| Dihydric mononuclear phenol | | Hydroquinone Resorcinol | Resorcinol | Resorcinol | Hydroquinone | None | Resorcinol | None |
| Content of the phenol (wt. % in the resin) | | 66 | 22.7 | 10.3 | 22.7 | 0 | 22.7 | 0 |
| Evaluation of coating film | Test method | | | | | | | |
| Film thickness (μ) | ASTM D 1186-53 (1973) | 16 | 16 | 16 | 16 | 16 | 16 | 16 |
| Pencil hardness | JIS K-5400 | 3H | 4H | 4H | 4H | 3H | 3H | 3H |
| Bending test (2 mmφ) (1) | " | ○ | ○ | ○ | ○ | ○ | ○ | ○ |
| T-bend test (t = 6) (1) | JIS G-3312 | ○ | ○ | ○ | ○ | ○ | ○ | ○ |
| T-bend test (t = 5) (1) | " | ○ | ○ | ○ | ○ | △ | △ | △ |
| Cross cut test | JIS D-0202 | 100/100 ○ | 100/100 ○ | 100/100 ○ | 100/100 ○ | 100/100 ○ | 100/100 ○ | 100/100 ○ |
| Erichsen test (distance to which the test piece has been forced out until adhesion is broken (2) | | 7.0 mm ○ | 7.3 mm ○ | 7.1 mm ○ | 7.3 mm ○ | 6.3 mm ○ | 6.2 mm ○ | 6.4 mm ○ |
| Du Pont impact test (2) strike on uncoated surface, striking rod ½", load 300 g (JIS G-3312) | 40 cm | × | ○ | × | ○ | × | × | × |
| | 35 cm | × | ○ | ○ | ○ | × | × | × |
| | 30 cm | ○ | ○ | ○ | ○ | × | × | ○ |
| | 25 cm | ○ | ○ | ○ | ○ | ○ | × | ○ |
| Salt spray test 5% salt water, 35° C., 250 hr (JIS K-5400) | Width of rust generated at the cross cut portion | 1 mm> | 1 mm | 1~2 mm | 1 mm | 2~3 mm | 3 mm | 2~3 mm |
| | Pitting at the flat | None | None | None | None | Observed | Observed | Observed |

TABLE 1-continued

| Sample (resin) | A | B | C | G | D | E | F |
|---|---|---|---|---|---|---|---|
| Molecular weight of the resin | 20000 | 35000 | 30000 | 46000 | 38000 | 7000 | 44000 |
| Dihydric mononuclear phenol | Hydroquinone Resorcinol | Resorcinol | Resorcinol | Hydroquinone | None | Resorcinol | None |
| Content of the phenol (wt. % in the resin) surface | 66 | 22.7 | 10.3 | 22.7 | 0 | 22.7 | 0 |

Judgement of appearance:
O: Good appearance without defects (e.g. peeling and cracking)
Δ: Some defects (e.g. peeling and cracking) observable.
×: Poor appearance with defects (e.g. peeling and cracking).
(1) Thickness of steel plate, 0.4 mm
(2) Thickness of steel plate, 0.8 mm

EXAMPLE 6

The sample B obtained in the production example was dissolved in ethyl cellosolve acetate to prepare a 25 wt.% solution. The solution was then mixed with zinc dust in varying ratios as described below to prepare zinc dust paints. In the same manner as in Example 5, test pieces were prepared to evaluate the physical properties of coating film. The results are shown in Table 2.

Recipe of paint:

| Recipe of paint: | | | | |
|---|---|---|---|---|
| Zinc dust | 90 | 85 | 75 | 65 |
| Sample B | 10 | 15 | 25 | 35 |

TABLE 2

| Evaluation of coating film | Test method | Weight ratio of zinc dust to sample | | | |
|---|---|---|---|---|---|
| | | 90/10 | 85/15 | 75/25 | 65/35 |
| Film thickness (μ) | ASTM | 16 | 16 | 16 | 16 |
| Erichsen test (distance to which the test piece was forced out, 7 mm) | | Δ | o | o | o |
| Du Pont impact test striking rod ¼", 300 g, 35 cm | JIS G-3312 | Δ | o | o | o |
| Salt spray test 5% salt water, 35° C. 250 hours | JIS K-5400 | o | o | Δ | × |

Judgement (appearance):
o Little or no defects (e.g. peeling, cracking) observable.
Δ Some defects (e.g. peeling, cracking) observable.
× Many defects (e.g. peeling, cracking) observable (not pass the test).

EXAMPLE 7

The samples A, B, C, D and E obtained in the production examples and a reference sample F were each dissolved in ethylene glycol monomethyl ether, and titanium oxide of the same amount as the resin was added. Each mixture was then formulated into a paint. The paint was coated on steel plate and dried, and the coating film obtained was measured for physical properties.

The recipe of the paint is as follows:

| | wt. % |
|---|---|
| Resin | 20 |
| Titanium oxide (Tipaque #820) | 20 |
| Ethylene glycol monomethyl ether | 60 |

The above mixture was thoroughly shaken together with glass beads to prepare a paint which was then coated on steel plate (thickness, 0.8 mm and 0.4 mm) by means of a bar coater, pre-dried in air and then dried at 120° C. for 60 minutes. Using this steel plate as test piece, the physical properties of the coating film were evaluated. The results are shown in Table 3.

TABLE 3

| Sample (resin) | | | | A | B | C | D | E | F |
|---|---|---|---|---|---|---|---|---|---|
| Molecular weight of the resin (GPC) | | | | 20000 | 35000 | 30000 | 38000 | 7000 | 44000 |
| Dihydric mononuclear phenol | | | | Hydroquinone Resorcinol | Resorcinol | Resorcinol | None | Resorcinol | None |
| Content of the phenol (wt. % in the resin) | | | | 66 | 22.7 | 10.3 | 0 | 22.7 | 0 |
| Evaluation of coating film | | | Test method | | | | | | |
| Film thickness (μ) | | | ASTM | 25~27 | 26~29 | 27~31 | 27~30 | 29~30 | 26~30 |
| Pencil hardness | | | JIS K-5400 | 6H | 8H | 8H | 5H | 3H | 6H |
| Bending test (2 mmφ) | | | " | ◎ | ◎ | ◎ | ◎ | ◎ | ◎ |
| T-bend test (t = 0) | | | JIS G-3312 | Δ | O | Δ | × | × | × |
| Cross cut test | | | JIS D-0202 | 100/100 ◎ | 100/100 ◎ | 100/100 ◎ | 100/100 ◎ | 100/100 ◎ | 100/100 ◎ |
| Erichsen test | | | | 7.7 mm ◎ | 8.1 mm ◎ | 7.7 mm ◎ | 8.0 mm ◎ | 7.8 mm ◎ | 8.0 mm ◎ |
| Du Pont impact test (JIS G-3312) | Strike on coated surface | Striking rod (¼") | 1000 g × 50 cm | × | × | × | × | × | × |
| | | | 1000 g × 40 cm | × | Δ | × | × | × | × |
| | | | 1000 g × 30 cm | ◎ | ◎ | ◎ | × | × | ◎ |
| | | | 1000 g × 20 cm | ◎ | ◎ | ◎ | ◎ | ◎ | ◎ |
| | Strike on uncoated surface | Striking rod (½") | 1000 g × 50 cm | × | × | × | × | × | × |
| | | | 1000 g × 40 cm | × | ◎ | Δ | × | × | × |
| | | | 1000 g × 30 cm | × | ◎ | ◎ | Δ | × | × |
| | | | 1000 g × 20 cm | ◎ | ◎ | ◎ | ◎ | × | ◎ |

TABLE 3-continued

| Sample (resin) | | A | B | C | D | E | F |
|---|---|---|---|---|---|---|---|
| Molecular weight of the resin (GPC) | | 20000 | 35000 | 30000 | 38000 | 7000 | 44000 |
| Dihydric mononuclear phenol | | Hydroquinone Resorcinol | Resorcinol | Resorcinol | None | Resorcinol | None |
| Content of the phenol (wt. % in the resin) | | 66 | 22.7 | 10.3 | 0 | 22.7 | 0 |
| Chemical resistance | Spot test | Film thickness, 5.6μ | Film thickness, 7.3μ | Film thickness, 6.4μ | Film thickness, 8.4μ | Film thickness, 10.3μ | Film thickness, 10.4μ |
| 5% Sodium hydroxide | 24 hours | ◎ | ◎ | ◎ | Blistering on the whole surface, ×× | O | Blistering on the whole surface, ×× |
| 5% Sulfuric acid | 24 hours | ◎ | ◎ | ◎ | Blistering on the whole surface, ×× | Blistering on part of the surface, × | Blistering on the whole surface, ×× |
| Salt spray test 5% salt water, 35° C., (evaluated based on the degree of rusting) | JIS K-5400 (168 hours) | Film thickness, 19μ △ | Film thickness, 23μ ◎ | Film thickness, 25μ ◎ | Film thickness, 27μ × | Film thickness, 26μ × | Film thickness, 25μ × |

Note:
◎ Excellent
O Good
△ Moderate
× Poor
×× Very poor

What is claimed is:

1. A zinc dust paint comprising zinc dust and poly(hydroxy ether) having a repeat unit of the formula:

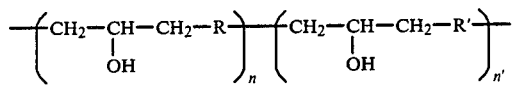

wherein R is an unsubstituted or substituted resorcinol residue, R' is a residue of a dihydric dinuclear phenol in which both monohydric phenols are linked to each other directly or through one carbon atom, n and n' each represents a positive number, provided that n and n' satisfy $35 \leq n+n' \leq 400$, the amount of resorcinol residue in the poly(hydroxy ether) being 10–40%, and the amount of zinc dust being 70–97% by weight.

2. A zinc dust paint according to claim 1, wherein the dihydric polynuclear phenol is at least one member selected from the group consisting of bis(4-hydroxyphenyl)-methane, 1,1-bis(4-hydroxyphenyl)ethane, bisphenol A, 2,2-bis(4-hydroxyphenyl)butane, 1,1-bis(4-hydroxyphenyl)-cyclohexane and 4,4'-dihydroxybiphenyl.

3. A zinc dust paint according to claim 1, wherein R is a resorcinol residue and R' is a bisphenol A residue.

4. Metal substrates coated with a zinc dust paint of claim 1.

5. Poly(hydroxy ether) having a repeat unit of the formula,

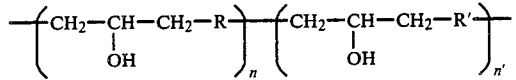

wherein R is a resorcinol residue, R' is a bisphenol A residue, n is a positive number and n' is a positive number, provided that n and n' satisfy $35 \leq n+n' \leq 400$.

6. Poly(hydroxy ether) according to claim 5, wherein the lower limit of $n+n'$ is about 120.

7. Poly(hydroxy ether) according to claim 5, wherein $n+n'$ is about 135.

8. Poly(hydroxy ether) according to claim 5, wherein $n+n'$ is about 120.

9. A zinc dust paint according to claim 1, wherein R is an unsubstituted resorcinol residue.

* * * * *